E. R. MASON.
Thill-Coupling.

No. 202,846. Patented April 23, 1878.

Witnesses:
R. G. Orwig.
W. A. White.

Inventor:
Edward R. Mason,
By Thomas G. Orwig
Attorney.

UNITED STATES PATENT OFFICE.

EDWARD R. MASON, OF DES MOINES, IOWA.

IMPROVEMENT IN THILL-COUPLINGS.

Specification forming part of Letters Patent No. 202,846, dated April 23, 1878; application filed October 16, 1877.

*To all whom it may concern:*

Be it known that I, EDWARD R. MASON, of Des Moines, in the county of Polk and State of Iowa, have invented an Improved Thill-Coupling, of which the following is a specification:

The object of my invention is to facilitate the attachment and removal of shafts and poles from vehicles to prevent rattling, and to retain all the parts of the coupling securely in place to prevent accidents.

It consists in arranging and combining with an axle-clip a fixed jaw having a fixed pintle, a hinged jaw having a hole for the fixed pintle, a sliding loop, and a removable thill-iron, in the manner hereinafter fully set forth.

Figure 1:
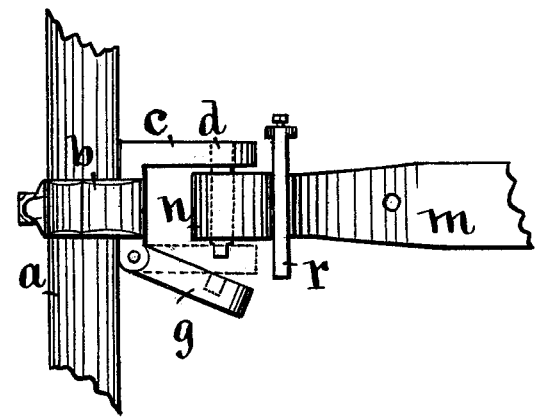
Figure 2:
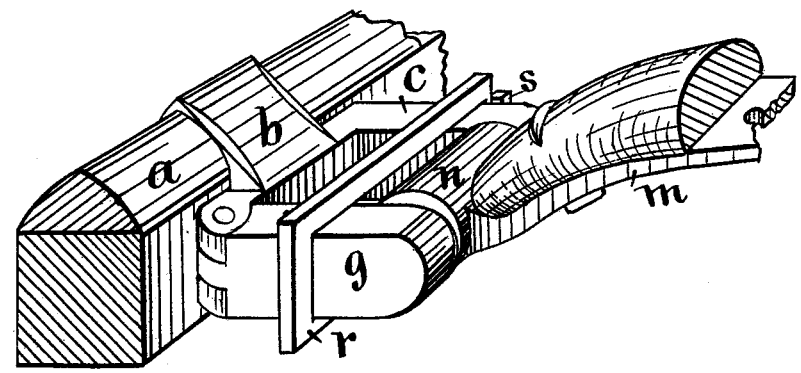

Figure 1 of the drawings is a top plan view of my invention. Fig. 2 is a perspective view. Together they illustrate the construction, application, and operation of my invention.

$a$ represents the front axle of a vehicle. $b$ is an axle-clip of common form. $c$ is a rigid jaw formed integral with the axle-clip $b$. $d$ is a bolt or pintle rigidly fixed to the front end of the jaw $c$ in such a manner as to project inward at right angles. It may be secured by means of a screw-thread, or in any suitable way.

$g$ is a jaw corresponding in size and shape with the rigidly-fixed jaw $c$. It is hinged at its rear end to the cross-head of the clip $b$ in such a manner that it will swing laterally. It has a hole in its inside face, near the front end, to admit the end of the pintle $d$.

$m$ is the thill-iron. It has a horizontal bore through its head $n$, designed to admit the pintle $d$.

$r$ is a rigid metal loop designed to slide over the two jaws $c$ and $g$, and to lock the hinged jaw rigidly when in a parallel position relative to its mating jaw $c$. $s$ is a set-screw carried in the end of the sliding loop $r$.

To attach a pair of shafts or a pole to a vehicle by means of my improved thill-coupling, I slip the loops $r$ forward over the heads $n$ of the thill-irons, and then, after first turning the hinged jaws $g$ open, both in one direction, I place the thill-iron heads $n$ upon the fixed pintles $d$. If they do not fill the space between the jaws, I insert suitable washers. After the thills are thus hooked upon the pintles I close the hinged jaws $g$, bring the thills level with the jaws, and slide the loop $r$ rearward, to encircle the jaws and lock the hinged parts $g$ securely in their places; and to prevent the loop from rattling or sliding, I clamp it fast by means of the set-screws $s$.

When horses are attached to the vehicle the thill-irons will angle upward from the jaws, and will at all times, when in practical use, prevent the locking-loops from escaping from the jaws, even when not clamped by the set-screws.

To detach the thills, reverse movements of the adjustable parts are required.

The advantages of a hinged jaw and a sliding loop are thus combined, and the difficulties and dangers incident to the use of springs and removable bolts in thill-couplings are dispensed with, and a simple, convenient, and reliable coupling provided, by means of which shafts and poles can be readily attached to or detached from a vehicle, as frequently required in the use of a vehicle adapted for one or two horses.

I am aware that a hinged jaw and a fixed jaw have been combined in a thill-coupling, and the hinged jaw locked by means of a spring-latch. I am also aware that a loop or yoke carrying set-screws has been used in a thill-coupling in combination with two rigid jaws; but my combination of an axle-clip, a fixed jaw having a fixed pintle, a sliding loop, and a removable thill-iron, is novel and greatly advantageous.

I claim as my invention—

In a thill-coupling, the axle-clip $b$, the rigid jaw $c$, having the fixed pintle $d$, the hinged jaw $g$, the sliding loop $r$, and the removable thill-iron $m$ $n$, when arranged and combined in the manner shown and described, and for the purposes specified.

EDWARD R. MASON.

Witnesses:
  WM. A. PARK,
  W. D. CHRISTY.